United States Patent Office 3,511,607
Patented May 12, 1970

3,511,607
LABORATORY REAGENT FOR ASSAY OF TOTAL BILIRUBIN
Stanley E. Green, Los Angeles, Calif., assignor to Smith Kline & French Laboratories, Philadelphia, Pa., a corporation of Pennsylvania
No Drawing. Filed Oct. 6, 1967, Ser. No. 673,303
Int. Cl. G01n 21/20, 31/22
U.S. Cl. 23—230          5 Claims

ABSTRACT OF THE DISCLOSURE

The stability of diazobenzene-p-sulfonic acid, a known reagent for measuring total bilirubin, is significantly enhanced by preparing a borofluoride salt thereof, as the assay reagent.

---

The present invention relates to reagent and reagent mixtures useful for detecting and measuring total bilirubin concentration in biological liquids, such as serum, and to methods of assaying biological liquids using these novel reagent mixtures.

Bilirubin is formed in the reticuloendothelial cells by the breakdown of hemoglobin. The sequence of events is hemoglobin→ hematin→ protporphyrin→ biliverdin→ bilirubin. Bilirubin is released from the reticuloendothelial cells into the blood in the free or unconjugated form, and travels attached to albumin or α-globulin which keep it in solution. It is not excreted by the kidneys.

Bilirubin is measured in blood serum by means of the van den Bergh test, a diazo reaction in which bilirubin reacts with diazobenzene-p-sulfonic acid (DASA) to split and form a dipyrryl pigment. With normal and heromlytic jaundice serum, alcohol or some similar substance must be added for the reaction to proceed rapidly. With obstructive jaundice serum, the reaction proceeds rapidly to a large extent without the addition of alcohol. This formation of a dipyrryl pigment promptly, without the addition of alcohol, is the direct van den Bergh reaction. The formation of the pigment after the addition of alcohol is the indirect van den Bergh reaction, a qualitative test.

However, the instability of the diazobenzene sulfonic acid in dry form is notorious. Thus, it is particularly difficult to store the reagent for any signficant length of time prior to use.

It is an object of this invention to provide a novel total bilirubin measuring reagent which employs a borofluoride salt of p-diazonium sulfonic acid as the reactant.

It is another further object of this invention to provide a stable total bilirubin measuring reagent which can be made available and shelf stored in unit amounts such as tablets and capsules.

It is still another object of this invention to provide a method of assaying for total bilirubin using a novel detecting reagent which employs a stable salt of p-diazoniumbenzene sulfonic acid.

It is a yet further object of this invention to provide a novel total bilirubin measuring reagent employing a novel buffer which permits maintaining the pH of the reagent mixture within the critical range during formulation.

It is an additional object of this invention to provide a method of assaying for total bilirubin which includes a novel solvent for the salt in an assay reagent for bilirubin in blood serum, which minimizes protein precipitation from serum during assay.

It is yet another object to provide an article of manufacture composed of a novel reagent mixture in a hermetically sealed unitary form for assaying for total bilirubin.

The reactive component of the stable reagent is a lyophilized borofluoride salt of the diazotized sulfanilic acid.

When the DASA salts are in a pure solid dry form, they may be ground into a dry powder suitable for mixing with a buffer, and filler.

This salt is very stable and can be made available as unit amounts, such as tablets in protective foil containers, or encapsulated in gelatin capsules. Each of these units will contain just a sufficient quantity of the assay material for making a single assay of a specimen.

In addition, suitable buffers, organic solvents, and filters, may be added to the reagent to give a stable reagent mixture, that is conveniently tableted or encapsulated. In order to make an assay, a package containing the assay material for making the particular assay is selected. The assay material contained in the package is pre-measured and of a pre-determined activity.

Accordingly, it may be dissolved directly in a standard amount of water so as to form a liquid reagent. This liquid reagent is then mixed with the biological specimen to produce an end point reaction. The extent to which the reaction occurs will be a function of the quantity present of the original unknown.

In a preferred embodiment, the assay material is dissolved to form a liquid reagent and the reagent is mixed with the specimen, the DASA salt will react with the unknown. The quantity of the salt contained in the reagent is in excess of that required to cause all of the unknown to completely react. As a result the only factor that limits the assay reaction will be the quantity of the unknown.

The extent to which the DASA salt is converted is determined by the extent to which the assay reaction progresses. The substrate will be readily converted from DASA salt to azobilirubin pigment, which has the properties of a photometric indicator.

Bilirubin has a light absorption at particular wavelengths only when it is in the combined form. When bilirubin is in the "free" form, it is transparent at the designated wavelength. The absorption band may be any desired wavelength that is convenient to use. Thus, by measuring the optical density at the designated wavelength, the amount of the diazo produce (pigment) formed may be determined. More specifically, by measuring the amount of change of the optical density, the amount of bilirubin present in serum may be measured.

In neutral and slightly acid solution the pigment is red with an absorption maximum, in the presence of serum, at a wavelength of 530–565 millimicrons. In alkaline solution, the pigment turns blue, (maximum at 600 m$\mu$), and in strongly acid solution it is likewise blue. By employing this salt, the assay reaction may be observed by always measuring the optical density within these wavelengths.

The particular fluoride salts employed will depend upon their availability, and their ability to stabilize DASA under test conditions. The salts will normally be chosen from the class that includes the borofluorides.

Among the preferred borofluorides are the alkali metal salts. Specific examples are lithium borofluoride $LiBF_4$, potassium borofluoride $KBF_4$, and sodium borofluoride $NaBF_4$ with the last having been found to be particularly advantageous.

Lyophilization of the borofluoride salt of DASA is then carried out by techniques well known to the art.

In one embodiment of the present invention, the bilirubin couples with the diazo reagent to form azobilirubin in acid solution. It has been observed that the degree of acidity must be regulated, since the efficiency and specificity of coupling with bilirubin depends upon a narrow pH range.

The optimum pH is conveniently obtained by the use of an dicarboxylic acid having from three to six carbon atoms. These pH regulators will normally be chosen from the group that includes, adipic acid, glutamic acid, succinic acid, malonic acid, and maleic acid, with the latter having been found to be particularly advantageous. Thus, the pH range is maintained acid, and in a preferred range of 1 to 2.

In addition to controlled acidic pH, it has been found that the reaction efficiency can be favorably influenced by the use of selected organic solvents, which aid in distinguishing between so-called direct and total bilirubin. In the absence of a selected organic solvent, the direct (conjugated) bilirubin reacts more rapidly than the free form.

Among the solvents which may be employed are: methanol, ethanol, isopropanol, butanol, formamide, dimethyl formamide, and dimethyl sulfoxide (DMSO). DMSO is preferred since it has minimal tendency to cause protein precipitation from blood serum, in whose presence the assay is frequently carried out.

An aqueous solution of DMSO, ranging from 30 to 50% DMSO is most advantageous since reagent solubility and lack of visible turbidity are then at an optimum level.

Where the reagents are to be unitized into compressed form before storage until actual use, the incorporation of filler materials is optionally employed. Polysaccharides are conveniently employed including lactose, maltose, and sucrose, with the latter being preferred.

Also, where the dry reagent mixture is to be tableted, a lubricant is conveniently incorporated into the mixture to insure operation of the tableting machine with binding. Among the lubricants which may be employed are boric acid, sodium benzoate, sodium lauryl sulfate and cetylpyridinium chloride.

As long as this powder is maintained dry it is very stable and possesses a long shelf-life. Accordingly, it may then be divided into unit amounts to form a liquid reagent with water suitable for making a single assay on a specimen of serum. Conveniently, each of these unit amounts may then be formed into foil-wrapped tablets, or packaged into a suitable container such as a gelatin capsule for delayed use.

In order to use one of the tablets or capsules to assay the concentration of total bilirubin present in a biological fluid, a specimen thereof, such as from blood serum, is first obtained. Following this, the assay material contained in one of the unitized assay reagents is dissolved in a suitable aqueous solvent. This will form a liquid reagent having the proper concentration of all reagent components for making a single assay on the specimen. This liquid reagent is thus mixed with the specimen with the following biochemical reaction occurring:

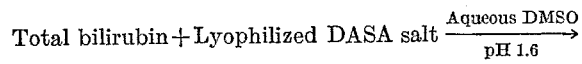

Azobilirubin (visible bluish purple at 560 m$\mu$)

The preparation and use of the reagent of this invention are exemplified by the following procedure.

EXAMPLE 1

In one embodiment a solid reagent or assay material is prepared that is adapted for measuring the amount of total bilirubin present in a serum. This reagent when fully prepared for use will consist of a dry mixture of the following components:
Active Principle: Borofluoride salt of p-diazonium benzene sulfonic acid.
Filler: Sucrose
Lubricant: Boric Acid The following procedure may be employed to produce a batch of dry assay material that may be divided into small unit quantities, as previously described.

Stabilization of diazobenzene-p-sulfonic acid

Minimizing reactivity of DASA during lyophilization, and in subsequent storage, is accomplished by suspending the acid and the fluoborate in water in amounts as shown:

Water—2000 ml.
Sulfanilic acid—382 g. (2.28 moles)
Sodium fluoborate—240 g. (2.2 moles)

The reaction mixture is cooled to 4° C. in an ice-bath, to which is added, dropwise, an aqueous solution of sodium nitrite (140 g., 2.0 moles) in 30 ml. of water. The reaction mixture is kept below 10° C. during the nitrite addition. The pH of the mixture is kept below 3 by the simultaneous dropwise addition of concentrated HCl. When nitrite addition is completed, the reaction mixture is conventionally lyophilized, yielding about 679 g. of a light tan powder, which is a mixture of the desired diazonium salt and sodium inorganic salts. The powder will maintain activity upon transfer to a dehumidified atmosphere.

When quantities are specified herein, they are suitable for preparing a reagent tablet that makes up to 1.5 ml. of liquid reagent upon tablet dissolution in 1.45 ml. of 30% strength DMSO (in water or physiological saline solutions). However, it is to be understood that these quantities may be directly scaled up to produce larger batches of dry reagent for a large number of assays to be prepared on a commercial basis.

A full scale batch is prepared and a satisfactory assay is obtained with the ingredients of a pilot batch. Since an important aspect of the stability of this composition resides in the complete dryness of the components, every precaution is taken to dehydrate the ingredients by vacuum drying, and to conduct weighing and measuring operations in a dehumidified atmosphere.

Final formulation of the reagent, prior to unitizing is as follows. The following dry ingredients are admixed in a Hobart mixer, yielding a dry mixture suitable for tableting (boric acid incorporation preferred) or encapsulating, by methods well known in the art.

| Ingredient: | Mg./tablet (capsule) |
| --- | --- |
| DASA salt | 6.0 |
| Maleic acid | 50.0 |
| Boric acid | 9.0 |
| Sucrose (filler) | 85.0 |
| Total | [1]150.0 |

[1] pH 1.6–1.8.

Dissolve one tablet (Capsule) in 1.45 ml. 30% aqueous DMSO in an optical cuvette giving an aqueous reagent. Add 50$\lambda$ (lambda) of a specimen of serum to be assayed (or control serum), providing 1.5 ml. of specimen (control) reagent mixture, and measure optical density (O.D.) at 560 m$\mu$.

Since the reaction stops when all bilirubin has reacted, it is not essential to maintain constant the temperature in the cuvette. Room temperature was selected for assay purposes, although any temperature between 25° C. and 37° C. may conveniently be used.

The cuvette containing the aqueous reagent-specimen mixture remains in the photometer, and measurement of the absorbance 560 m$\mu$ and 600 m$\mu$ is made 5 or 10 minutes later. Usually the reaction is over in 5 minutes, and the blue color is stable for an extended period.

By taking the difference in the final absorbance readings at 560 m$\mu$ and 600 m$\mu$, this gives a $\Delta$O.D., which is proportional to the concentration of total bilirubin present in the specimen being assayed.

What is claimed is:
1. A stable assay material for dissolving in aqueous solution to create a liquid reagent for assaying a specimen for total bilirubin, comprising:
a lyophilized reagent comprising a borofluoride salt of p-diazoniumbenzene sulfonic acid, and
a dry pH regulator capable of maintaining an acid pH.

2. The material of claim 1 wherein said borofluoride salt is the sodium salt.

3. The material of claim 1 wherein said aqueous solution is aqueous dimethylsulfoxide.

4. The material of claim 1 wherein said pH regulator is maleic acid.

5. The method of assaying a specimen for total bilirubin, including the steps of
  dissolving into an aqueous organic solvent, a substantially anhydrous solid reagent material comprising:
  a lyophilized reagent comprising a borofluoride salt of diazoniumbenzene-p-sulfonic acid, present in a sufficiently large quantity to react with all said bilirubin present in said specimen; and
  a dry pH regulator capable of maintaining an acid pH, thereby to produce a liquid reagent having a measureable optical density;
  mixing said liquid reagent with said specimen to form a specimen-reagent mixture; and
  determining the amount of change of optical density of the reacted specimen-reagent assay mixture.

References Cited

UNITED STATES PATENTS 2,854,317  9/1958  Free.

OTHER REFERENCES

K. H. Saundres, "The Aromatic Diazo-Compounds and Their Technical Applications," p. 80, Edward Arnold and Co., London, 1949.

C. A. 56:12935 (May 1962).

MORRIS O. WOLK, Primary Examiner

S. MARANTZ, Assistant Examiner

U.S. Cl. X.R.

8—44; 252—408